United States Patent
Chia et al.

(10) Patent No.: US 6,446,156 B1
(45) Date of Patent: Sep. 3, 2002

(54) PROPOSAL OF CAPACITY TUNING IN THE PRODUCTION PROCESS OF STORAGE DISC DRIVES

(75) Inventors: Kok Hoe Chia; Teck Khoon Lim; Beng Wee Quak; Kok Seng Lim; Song Wee Teo, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,530

(22) Filed: Dec. 30, 1999

Related U.S. Application Data
(60) Provisional application No. 60/130,282, filed on Apr. 21, 1999.

(51) Int. Cl.$^7$ .............................................. G06F 12/00
(52) U.S. Cl. ............................ 711/4; 711/112; 360/48
(58) Field of Search ........................ 714/6; 711/4, 112; 360/40, 31, 75, 48, 97.01; 324/212

(56) References Cited

U.S. PATENT DOCUMENTS

| | | | |
|---|---|---|---|
| 3,947,876 A | * 3/1976 | Gray | 360/40 |
| 4,348,761 A | 9/1982 | Berger | 371/21 |
| 4,641,207 A | 2/1987 | Green et al. | 360/55 |
| 4,929,894 A | 5/1990 | Monett | 324/212 |
| 4,945,427 A | * 7/1990 | Cunningham | 360/75 |
| 4,949,036 A | 8/1990 | Bezinque et al. | 324/212 |
| 5,050,169 A | 9/1991 | Monett | 371/21.2 |
| 5,280,395 A | * 1/1994 | Matsuzaki | 360/31 |
| 5,296,979 A | * 3/1994 | Kawabe et al. | 360/97.01 |
| 5,422,890 A | 6/1995 | Klingsporn et al. | 371/21.6 |
| 5,442,638 A | * 8/1995 | Awad et al. | 714/6 |
| 5,537,264 A | * 7/1996 | Pinteric | 360/31 |
| 5,568,696 A | * 10/1996 | Mauch et al. | 42/49.02 |
| 5,589,777 A | 12/1996 | Davis et al. | 324/537 |
| 5,654,841 A | * 8/1997 | Hobson et al. | 360/75 |
| 5,657,176 A | * 8/1997 | Moribe et al. | 360/31 |
| 5,870,237 A | * 2/1999 | Emo et al. | 360/48 |
| 5,895,438 A | 4/1999 | Yomtoubian | 713/2 |
| 5,951,687 A | 9/1999 | Chan et al. | 713/2 |
| 5,953,689 A | 9/1999 | Hale et al. | 702/186 |
| 5,999,352 A | * 12/1999 | Teck et al. | 360/48 |
| 6,204,660 B1 | * 3/2001 | Lee | 324/212 |

* cited by examiner

Primary Examiner—David Hudspeth
Assistant Examiner—Fred F. Tzeng
(74) Attorney, Agent, or Firm—Westman, Champlin & Kelly

(57) ABSTRACT

A disc drive production process automatically configures the disc drive to a suitable capacity based upon the data transfer capability of each of the head/disc surface combinations in the drive. The error rate of each of the head/disc surface combinations is determined as a function of the bit density of the disc surface. Based on the data transfer capability of the head/disc surface combinations, one of three drive configuration schemes is selected. A variable BPI (bits per inch) scheme reduces the data rate of a weak head/disc surface combination while increasing the data rate of a strong head/disc surface combination. If the drive contains one very weak head/disc surface combination, a head depopulation scheme disables the very weak head. If the drive contains two or more very weak heads, a de-frequency scheme reduces the overall capacity of the drive.

14 Claims, 6 Drawing Sheets

PROPOSAL OF CAPACITY TUNING IN THE PRODUCTION PROCESS OF STORAGE DISC DRIVES

CROSS-REFERENCE TO RELATED APPLICATION

This application claims the benefit of U.S. Provisional Patent Application No. 60/130,282, entitled "PROPOSAL OF CAPACITY TUNING IN THE PRODUCTION PROCESS OF STORAGE DISC DRIVES," filed on Apr. 21, 1999.

The following U.S. patent application, assigned to the same assignee as the present invention, is related to the present application: U.S. patent application Ser. No. 08/857,519, entitled "VARIABLE BITS PER INCH RECORDING," filed on May 16,1997.

FIELD OF THE INVENTION

The present invention relates generally to disc drive data storage systems. More particularly, the present invention relates to configuring a disc drive to its most suitable capacity.

BACKGROUND OF THE INVENTION

A typical disc drive data storage system can include multiple magnetic discs mounted for rotation on a hub or spindle. A spindle motor causes the discs to spin and the surface of the discs to pass under respective head gimbal assemblies (HGAs). The HGAs carry transducers which write information to, and read information from the disc surfaces. An actuator mechanism moves the HGAs from track to track across surfaces of the discs under control of electronic circuitry. Read and write operations are performed through a transducer which is carried on a slider body. The slider and transducer are sometimes collectively referred to as a head, and typically a single head is associated with each disc surface. The heads are selectively moved under the control of electronic circuitry to any one of multiple circular, concentric data tracks on the corresponding disc surface by an actuator device. Each slider body includes an air bearing surface (ABS). As the disc rotates the disc drags air beneath the ABS, which develops a lifting force which causes the head to lift and fly several microinches above the disc surface.

The current typical production process of disc drives utilizes a fixed sequence of tests to determine if a disc drive is capable of meeting the specification set for a capacity. If it does, then it is considered a passed drive. If it does not, then it is deemed a failed drive and the drive is diagnosed to determine the probable cause of failure and the rework needed. This process is relatively inefficient. The task of reworking is very time consuming and costly. It will physically involve operators doing the job. Often, rework yields are poor, primarily because there is no fixed rule as to a cause of a failure. The physical rework also means that a certain amount of production floor area and resources have to be used and allocated for the process. Thus, there is a need to include in the production process a way to predict the capacity the drive is able to take and hence configure it to that capacity.

The present invention provides a solution to this and other problems and offers other advantages over the prior art.

SUMMARY OF THE INVENTION

The present invention relates to configuring a disc drive to its most suitable capacity.

One embodiment of the present invention is directed to a method of configuring a disc drive. A data transfer capability of the disc drive is determined and the disc drive is configured based on the data transfer capability.

In one embodiment of the present invention, configuring the disc drive involves adjusting the data storage capacity of the disc drive based on the data transfer capability of the disc drive.

In another embodiment, the data transfer capability is determined for a plurality of head/disc surface combinations in the disc drive and the disc drive is configured based on the data transfer capabilities of each head/disc surface combination.

In a further embodiment, if the data transfer capability of the disc drive is below a first threshold, the bit density of the disc surface of an inferior head/disc surface combination is reduced and the bit density of the disc surface of a better head/disc surface combination is increased. If, after that, the data transfer capability of the disc drive remains below the first threshold, it is determined how many, if any, of the head/disc surface combinations have a data transfer capability below a second threshold. If one of the head/disc surface combinations have a data transfer capability below the second threshold, the head of said head/disc surface combination is disabled. If two or more of the head/disc surface combinations have a data transfer capability below the second threshold, the bit density of the entire disc drive is reduced.

Another embodiment of the present invention is directed to a program storage device that is readable by a computer system and that tangibly embodies a program of instructions executable by the computer system to perform a method of configuring a disc drive. Pursuant to the method, a write/read error rate is measured for each head/disc surface combination as a function of the bit density of the respective disc surfaces. Then a suitable drive configuration scheme is selected based on the error rate data. Next the selected drive configuration scheme is implemented.

In one embodiment of the program storage device, selecting a suitable drive configuration scheme involves selecting the scheme from multiple drive configuration schemes. In one of the drive configuration schemes, the bit density of the disc surface of one head/disc surface combination is reduced and the bit density of the disc surface of another head/disc surface combination is increased. Another of the drive configuration schemes involves disabling the head of a particular head/disc surface combination. A third drive configuration scheme involves reducing the bit density of the entire disc drive.

DETAILED DESCRIPTION OF ILLUSTRATIVE EMBODIMENTS

Figure 1:
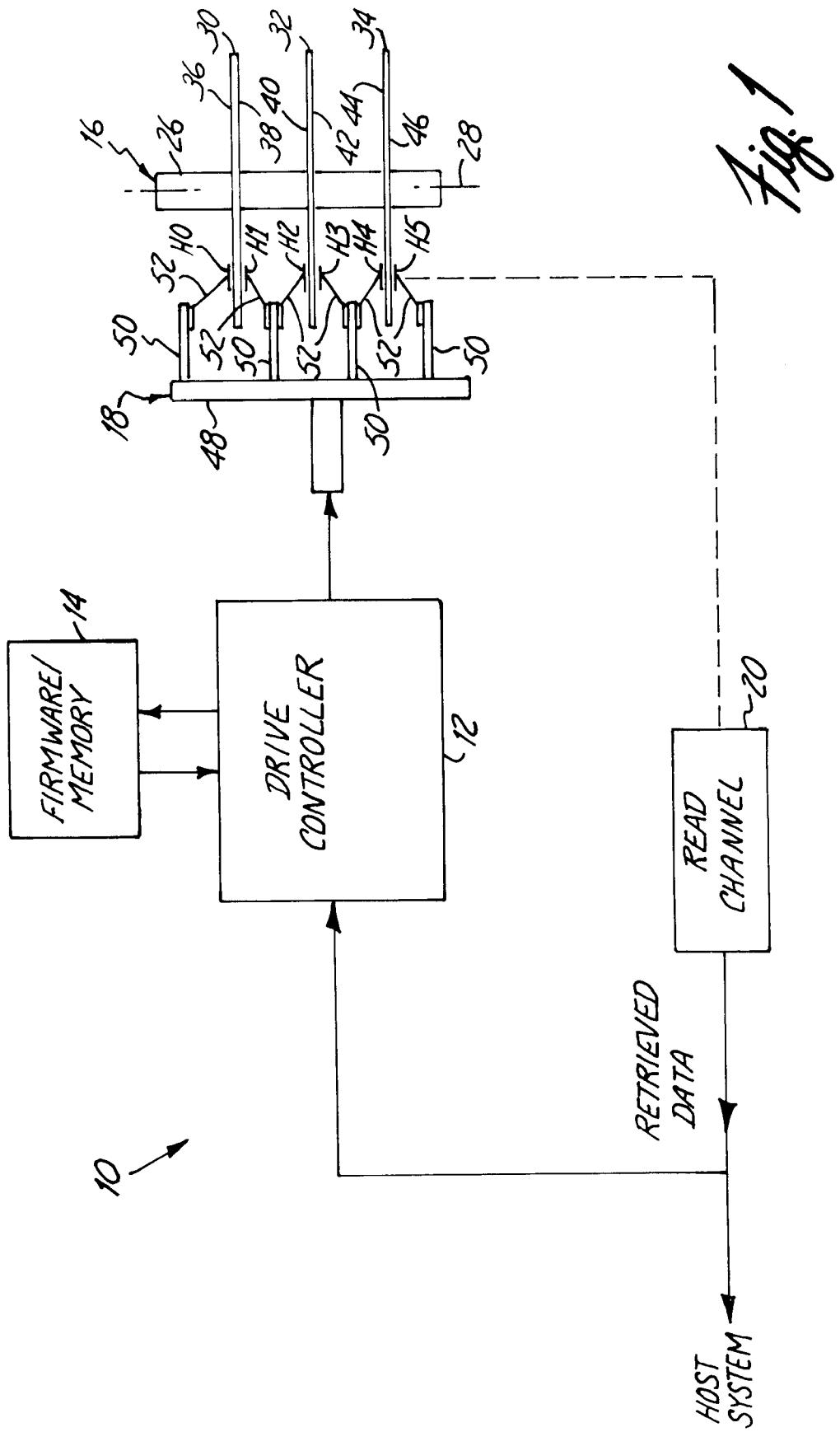
FIG. 1 is a block diagram of a disc drive according to an illustrative embodiment of the present invention.

FIG. 1 is a block diagram of disc drive 10 according to the present invention. Disc drive 10 includes drive controller 12, memory 14, disc stack assembly 16, actuator assembly 18 and read channel 20. Drive controller 12 is typically a microprocessor or digital computer, and is coupled to a host system which instructs controller 12 to store data on, and retrieve data from, disc stack 16.

Memory 14 can be any of a variety of well known data storage devices capable of storing data for use by controller 12. Also, memory 14 can include a combination of different types of memory devices such as read only memory (ROM) and volatile or non-volatile random access memory (RAM). In an illustrative embodiment, memory 14 stores the firmware programming used by drive controller 12 in order to implement the capacity tuning aspects of the present invention. Disc stack assembly 16 includes spindle 26 which supports multiple coaxially arranged discs 30, 32 and 34. The discs are mounted for rotation with spindle 26 about axis of rotation 28. Each of the discs has a first surface and a second surface. First disc 30 has first surface 36 and second surface 38. Second disc 32 has first surface 40 and second surface 42. Third disc 34 has first surface 44 and second surface 46. All of surfaces 36, 38, 40, 42, 44 and 46 include concentric tracks for receiving and storing data in the form of flux reversals encoded on the tracks. A group of tracks which include one track on each of surfaces 36, 38, 40, 42, 44 and 46, wherein each track in the group is located a common radial distance from the inner diameter of the corresponding disc upon which is resides, is referred to as a cylinder.

Actuator assembly 18 includes actuator 48 supporting multiple actuator arms 50. Each of actuator arms 50 is rigidly coupled to at least one head assembly 52. Each head assembly 52 includes a load beam, or a flexure arm, rigidly coupled to actuator arm 50 at a first end, and to a suspension or gimbal at a second end. The suspension is, in turn, coupled to a slider which supports a data head (i.e., data heads H0, H1, H2, H3, H4 and H5) above the corresponding disc surface. Each slider has an air bearing surface, which can be adapted for flying over the respective disc surface or sliding in pseudo-contact or direct contact with the respective disc surface, depending on the particular application. Each data head typically includes a read transducer and a write transducer carried by a slider. As shown, data heads H0, H1, H2, H3, H4 and H5 are supported adjacent respective medias or disc surfaces 36, 38, 40, 42, 44 and 46. Together, a data head and its associated disc surface form what will be referred to herein as a head/disc surface combination. For example, head H0 and disc surface 36 constitute a single head/disc surface combination.

Actuator 48 is rotatably mounted with respect to discs 30, 32 and 34. Actuator 48 typically includes a voice coil which interacts with a magnet to produce the selective rotation of actuator 48. As actuator 48 rotates, it moves the transducers coupled to the head assemblies either radially inward or radially outward on the discs. In this way, actuator 48 positions the transducers on the various heads over a desired track (and cylinder) on the corresponding discs. In an alternative embodiment, actuator 48 is a linear actuator.

Read channel 20 is electrically coupled to each of heads H0, H1, H2, H3, H4 and H5 and carries signals read by various heads from their corresponding disc surfaces to a host system which has instructed disc drive 10 to retrieve the data. Also, read channel 20 can carry servo signals read by one or more of the heads from a servo data track. As is known in the art, the servo position information can be provided to drive controller 12 and used to control actuator assembly 18 to achieve head positioning over a desired cylinder. Read channel 20 can also include other components, for example amplifiers and filters, for conditioning the read back signal.

Figure 2:
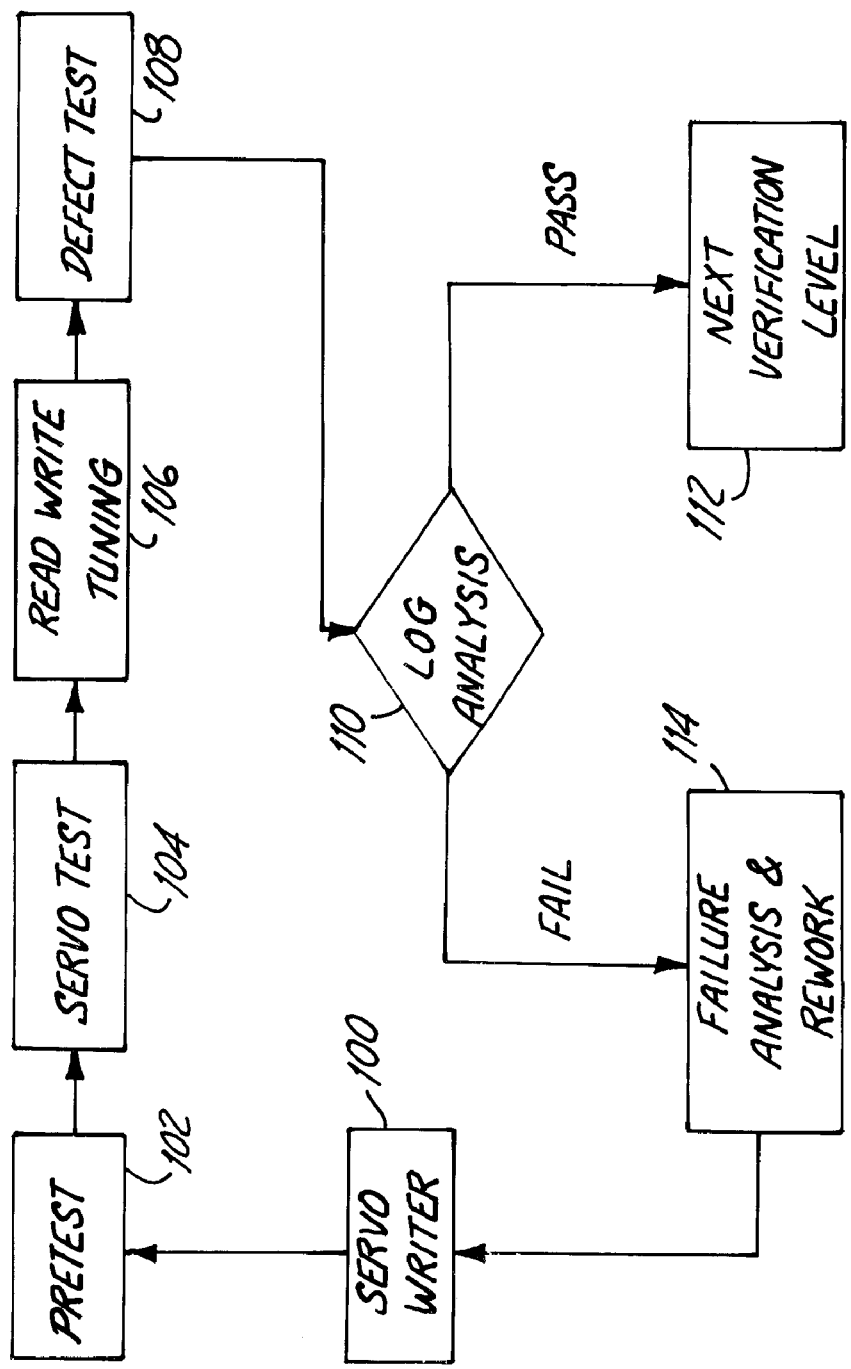
FIG. 2 is a flowchart showing a prior art process flow for the production of hard disc drives.

FIG. 2 shows the typical prior art process flow for the production of hard disc drives. At servo writer 100, the servo pattern is written onto the physical tracks. At pretest 102 a reserve system area in the drive is prepared for storing firmware code. At servo test 104, bad servo sectors are mapped out of the drive. At read/write tuning 106, the read/write chip system is calibrated so that the read/write parameters will be optimized for the read/write signals. At defect test 108, any defective user data sectors are captured. At log analysis 110, the results of the defect test are used to decide the pass/fail status of the drive. Passed drives are forwarded to the next verification level 112, while failed drives are taken out for failure analysis and rework 114. The task of reworking is very time consuming and costly. It will physically involve operators doing the job. Often, rework yields are bad primarily because there is no fixed rule as to a cause of a failure. The physical rework also means that a certain amount of production floor area and resources have to be used and allocated for the process.

Figure 3:
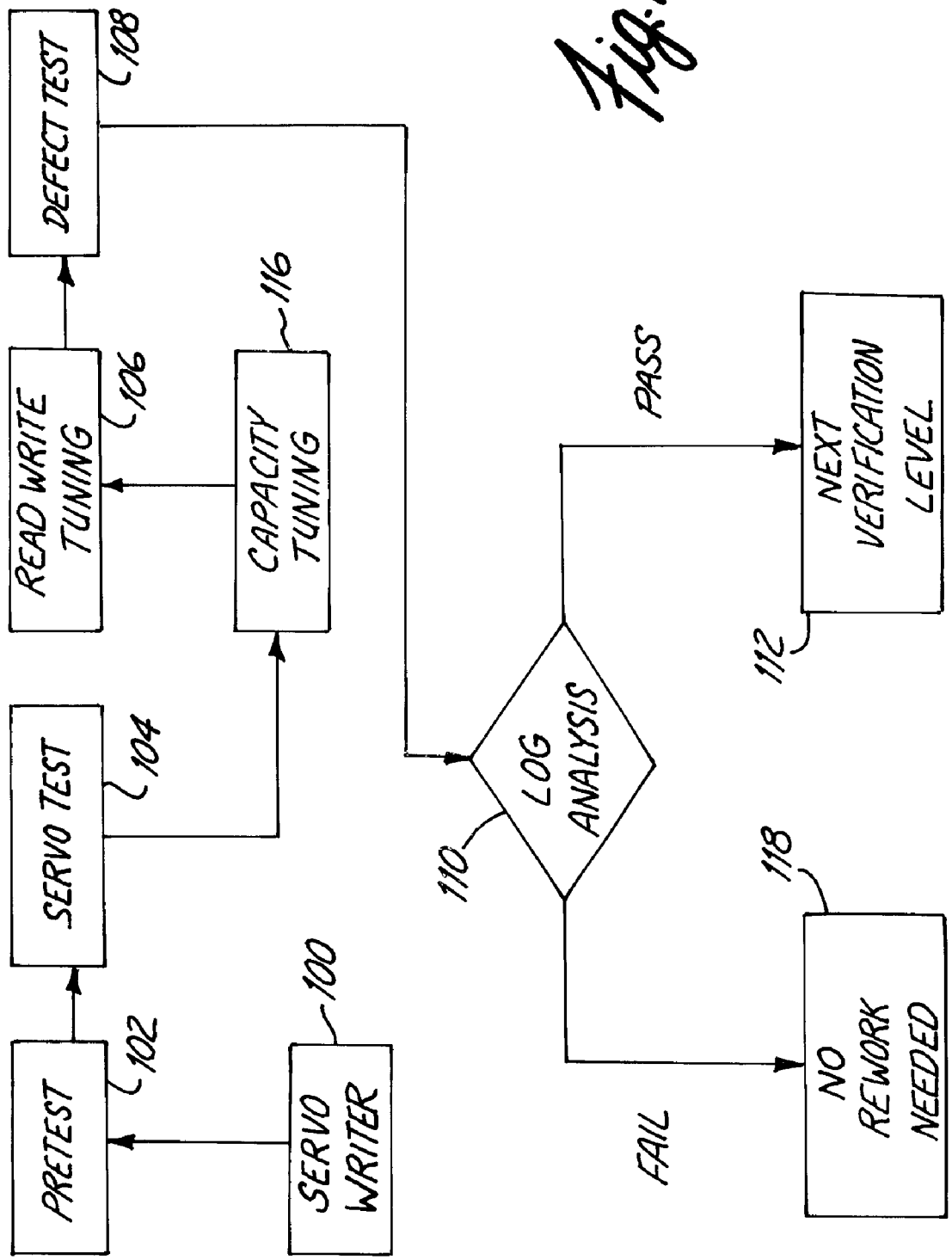
FIG. 3 is a flowchart showing a process flow for the production of hard disc drives according to an illustrative embodiment of the present invention.

FIG. 3 shows a process flow for the production of a hard disc drive according to an illustrative embodiment of the present invention. The production method shown in FIG. 3 utilizes capacity tuning to minimize or eradicate the need to perform failure analysis and rework on failed drives. In FIG. 3, like elements to FIG. 2 are similarly numbered. Capacity tuning 116 auto configures the disc drives to a suitable capacity size. In another words, in an illustrative embodiment, capacity tuning 116 is simply a module integrated in the process to predict the quality of a disc drive before the defect test phase 108 (which typically takes more than 8 hours) and then configure the disc drive to its most suitable capacity. Therefore, capacity tuning 116 not only cuts down tremendous usage of manpower, time and resources, it can also bring up the yield for the production of drives. In addition, the number of drives that need to be reworked will be negligible. Hence, there may not be a need for a rework process 114, as indicated at block 118.

Figure 4:
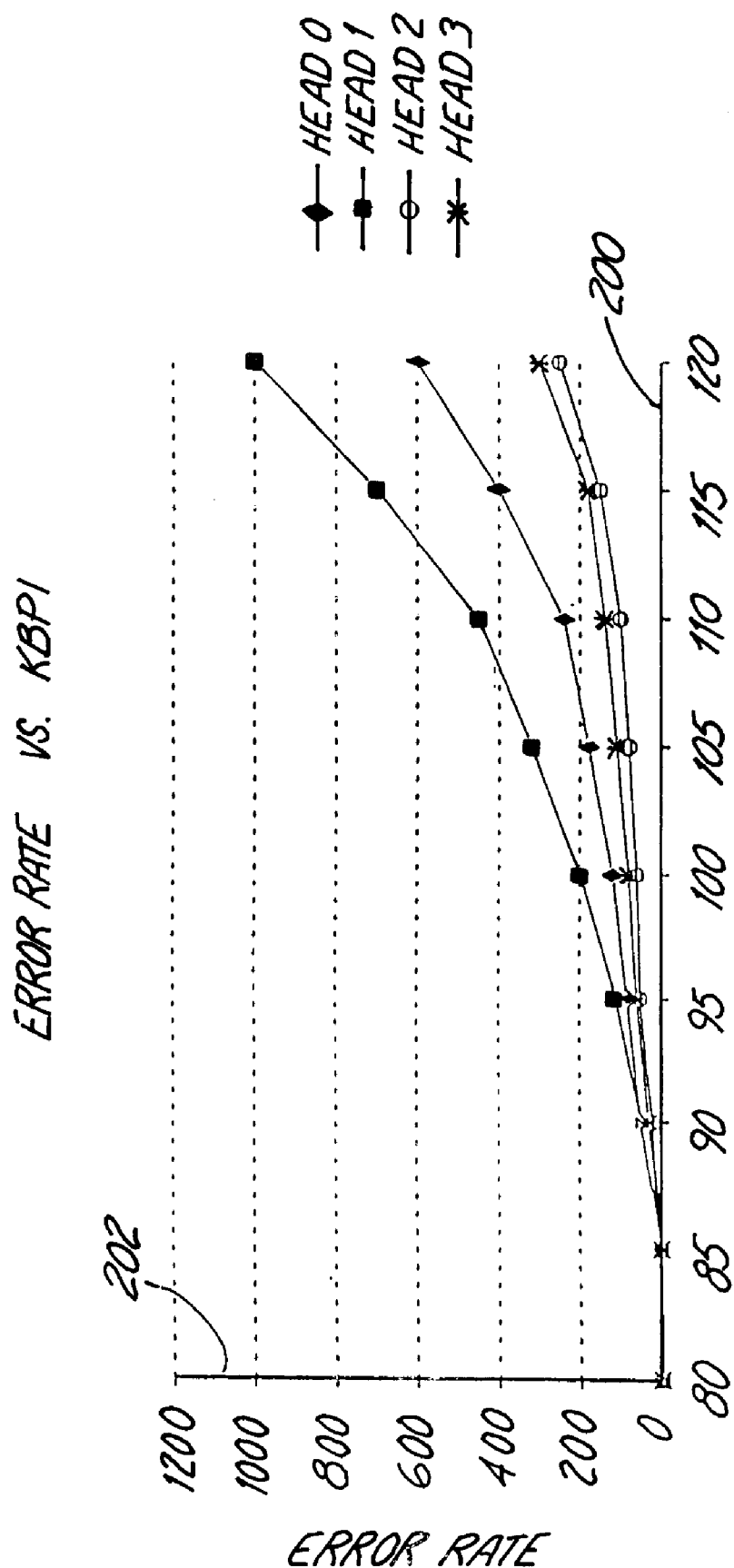
FIG. 4 is a graph of error rate vs. bit density for a hypothetical disc drive.

Capacity tuning methodology is implemented based on the data transfer capability of the various head/disc surface combinations in the disc drive. In an illustrative embodiment, the data transfer capability of a head/disc surface combination, and of the disc drive as a whole, is represented by the characteristic of error rate vs. KBPI. KBPI (Kilo Bits Per Inch) is a measure of the bit density of the disc surface and is used as a measure of the amount of data rate assigned to a head/disc surface combination. The error rate vs. KBPI characteristic of a higher-quality head/disc surface combination will tend to have a smaller gradient as compared to a lower-quality head/disc surface combination. This means that higher-quality head/disc surface combinations can take more capacity of data rate than lower-quality head/disc surface combinations. FIG. 4 is a representative error rate vs. KBPI plot for four hypothetical head/disc surface combinations. In FIG. 4, x-axis 200 represents the bit density in KBPI and y-axis 202 represents the error rate. In the example of FIG. 4, head/disc surface combination 1 is the weakest head/disc surface combination of the four. That is to say that head/disc surface combination 1 has the lowest data transfer capability of the four. According to an illustrative embodiment of the present invention, based on this error rate vs. KBPI characteristic, which is determined as part of the capacity tuning process, we can determine the quality of each head/disc surface combination and configure the bit density of each head/disc surface combination, and the capacity of the disc drive as a whole, accordingly.

Figure 5:
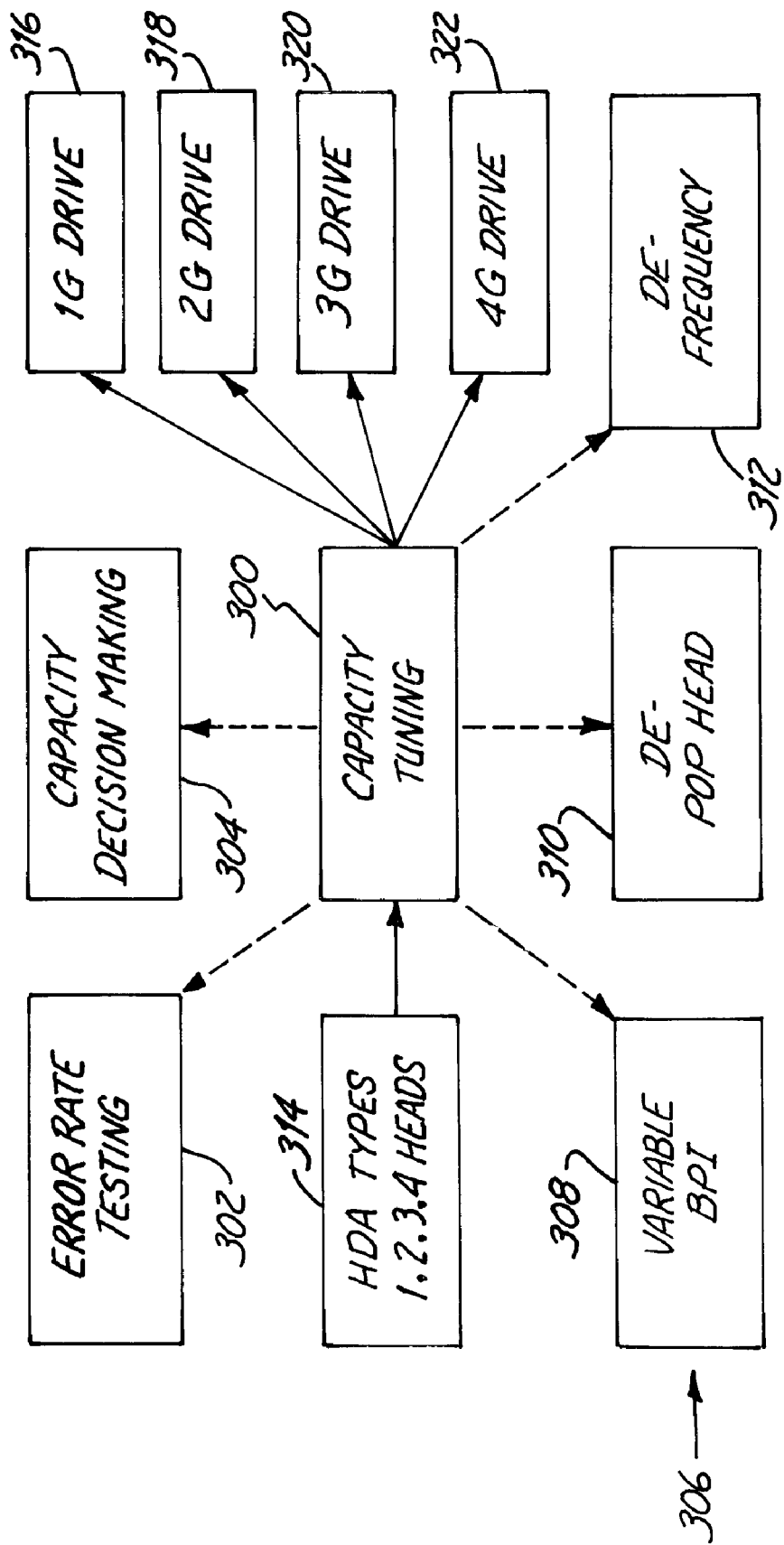
FIG. 5 is a block diagram demonstrating a capacity tuning process according to an illustrative embodiment of the present invention.

FIG. 5 is a block diagram demonstrating a capacity tuning process according to an illustrative embodiment of the present invention. Capacity tuning 300 comprises three modules, namely error rate testing engine 302, capacity decision making engine 304, and capacity configuration engine 306. Error rate testing engine 302 performs a write/read testing process on the drive. In an illustrative embodiment, this write/read testing determines the data transfer capability of each individual head/disc surface combination in the disc drive and of the disc drive as a whole. Illustratively, the write/read test is carried out on each head/disc surface combination at several pre-selected data rates which are higher than the nominal operating data rate points of the head/disc surface combinations. This results in an error rate vs. KBPI characteristic, such as that shown in FIG. 4, for each of the head/disc surface combinations. This error rate vs. KBPI characteristic for each head/disc surface combination is compared with empirical results to determine their qualities. Illustratively, the error rate vs. KBPI characteristic is compared to an error rate vs. KBPI characteristic for a nominal head from the laboratory. Based on the qualities of all the head/disc surface combinations, capacity decision making engine 304 then decides a suitable configuration scheme to be applied to the disc drive. In an illustrative embodiment, there are three different configuration schemes that are available to be applied in the capacity configuration engine 306. The three modules are variable BPI 308, head depopulation 310 and de-frequency 312.

According to an illustrative embodiment of the present invention, if capacity decision making module 304 determines that the data transfer capability of the disc drive is above a predetermined threshold, no further capacity configuration is performed and the drive is configured at its present capacity. In an illustrative embodiment, this threshold corresponds to a desired error rate at the target data storage capacity of the disc drive. If the data transfer capability of the disc drive is below the predetermined threshold, variable BPI scheme 308 is considered to check if the desired data transfer capability of the disc drive can be achieved. In an illustrative embodiment, capacity decision making module 304 predicts whether variable BPI scheme 308 will raise the data transfer capability of the disc drive to the predetermined threshold and, if not, variable BPI scheme 308 is bypassed. In an alternative embodiment, variable BPI scheme 308 is performed without first predicting whether variable BPI scheme 308 will raise the data transfer capability among the heads of the disc drive to the predetermined threshold.

Variable BPI (bits per inch) 308 is a scheme that is used to change the data rate across the heads without actually changing the overall targeted capacity of a drive. This scheme can be achieved by reducing the data rate, i.e., the bit density, of weak head/disc surface combinations and increasing the data rate of good head/disc surface combinations so as to maintain the original total data rate of the drive. In an illustrative embodiment, special precautions are taken to ensure that good head/disc surface combinations will not be overstressed to compensate for the loss of data rate from weak head/disc surface combinations. Also, in an illustrative embodiment, variable BPI scheme 308 is not used when the number of good head/disc surface combinations is less than the number of bad head/disc surface combinations in the disc drive. Additionally, it should be noted that variable BPI scheme 308 can be performed on the drive even though the data transfer capability of the drive is above the required threshold, thereby further enhancing the performance of the drive. Variable BPI technology is thoroughly described in U.S. patent application Ser. No. 08/857,519, entitled "VARIABLE BITS PER INCH RECORDING," filed on May 16, 1997, and assigned to the same assignee as the present invention.

According to an illustrative embodiment of the present invention, if variable BPI scheme 308 cannot raise the data transfer capability of the disc drive above the predetermined threshold, head depopulation scheme 310 is considered by capacity decision making module 304 to determine if the desired data transfer capability of the disc drive can be achieved. Head depopulation 310 is a methodology in which the head of a very weak head/disc surface combination is disabled so as to enable the drive to meet the next lower capacity configuration with the remaining good head/disc surface combinations. According to an illustrative embodiment, a given head is disabled if the data transfer capability of the associated head/disc surface combination measured by error rate testing module 302 falls below a predetermined threshold. In an illustrative embodiment, head depopulation scheme 310 can also be used in conjunction with variable BPI scheme 308 to achieve the same capacity or the next lower capacity point in the same family of drives.

In an illustrative embodiment of the present invention, if variable BPI 308 and head depopulation 310 processes failed to achieve a given drive data storage capacity, such as a nominal capacity, de-frequency scheme 312 is implemented by capacity decision making module 304. In a further illustrative embodiment, de-frequency scheme 312 is implemented when the drive has more than one very weak head/disc surface combination. Such a condition is illustratively detected if more than one head/disc surface combination has a data transfer capability lower than the predetermined threshold referred to above with respect to depopulation scheme 310. De-frequency 312 is a methodology that reconfigures the hard disc drive to a lower capacity point by decreasing the data rate, i.e., the bit density, across all or most of the drive.

Depending on the size of the disc drive (e.g., 1, 2, 3, or 4 heads), capacity tuning module 300 will automatically configure each individual disc drive to a suitable capacity. In an illustrative embodiment, capacity tuning module 300 configures the disc drive to one of a plurality of discrete capacity points. For example, capacity tuning module 300 might configure the disc drive to a capacity point of one gigabyte (1G) 316, two gigabytes (2G) 318, three gigabytes (3G) 320, or four gigabytes (4G) 322 by adopting a suitable configuration scheme.

Figure 6:
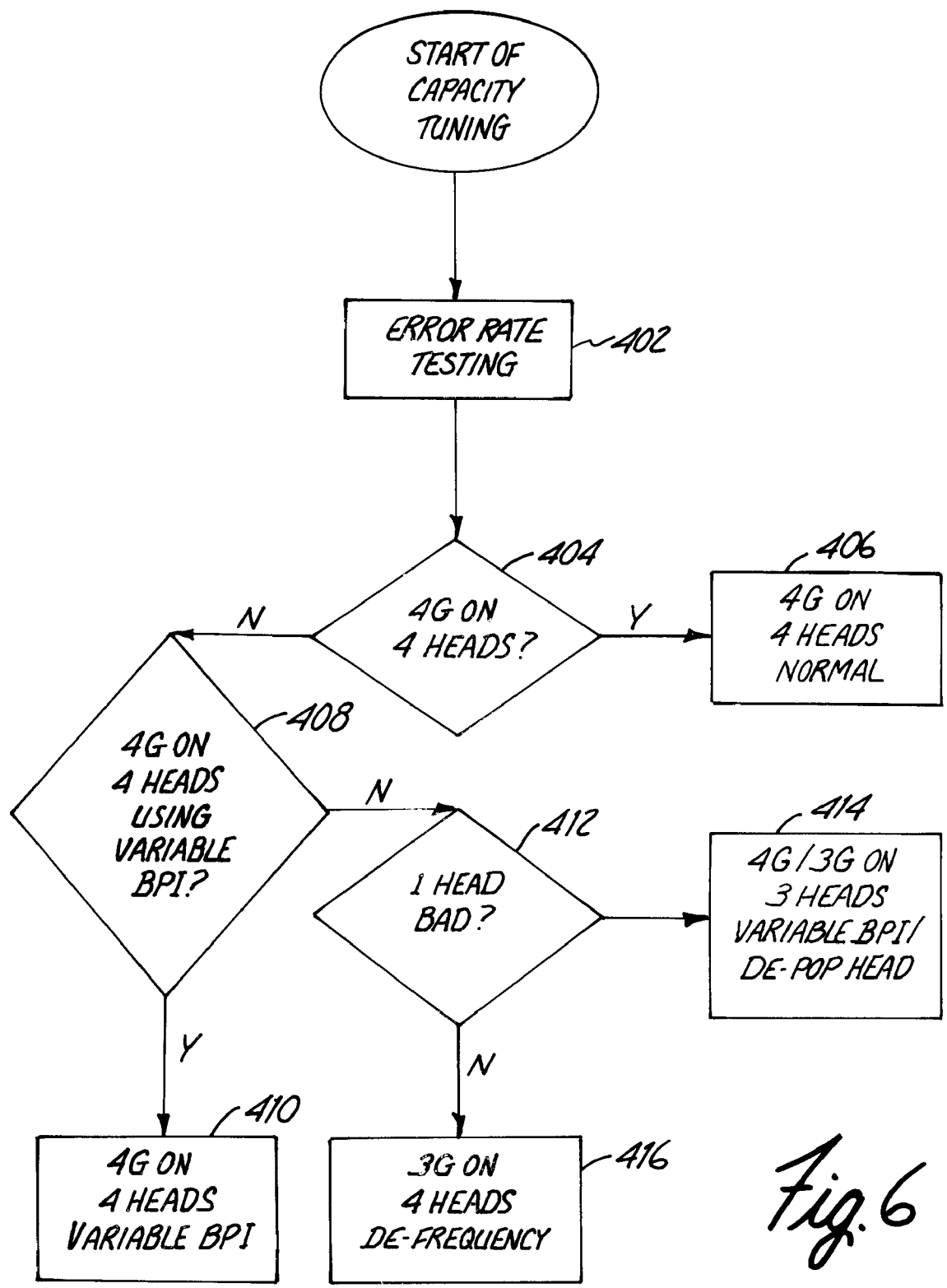
FIG. 6 is s flowchart showing an exemplary process flow for the production of hard disc drives according to an illustrative embodiment of the present invention.

FIG. 6 illustrates an example of a process flow for a four-head disc drive. In this example, the normal targeted capacity size of the disc drive is four gigabytes of user storage space. The result of error rate vs. KBPI test 402 from the error rate testing engine 302 is input into the capacity decision making module 304 for processing. If it is determined at module 404 that the disc drive can support four gigabytes of data on four head/disc surface combinations, then the disc drive will be configured as normal targeted 4G capacity, as indicated at block 406. In an alternative embodiment, variable BPI scheme 308 can be performed on the drive, to improve the performance of the drive, even though the drive would be able to support 4G of capacity without variable BPI scheme 308. If the disc drive is not suitable for the normal assignment of 4G of data on four head/disc surface combinations, variable BPI scheme 308 will be considered to check if the disc drive can be salvaged to meet the original targeted capacity, as indicated at module 408. If the target capacity can be achieved using variable BPI scheme 308, the drive is so configured, as shown at block 410. If variable BPI scheme 308 is not suitable, or not effective enough to achieve the target capacity, then capacity decision making module 304 will check to see if one of the head/disc surface combinations is very bad, as indicated at module 412. If this is found to be the case, then head depopulation scheme 310 is deployed to disable the head of the bad head/disc surface combination and configure the disc drive to a 3G data capacity on the three remaining good head/disc surface combinations, as shown at bock 414. In an illustrative embodiment, head depopulation scheme 310 may be used in conjunction with variable BPI scheme 308 to achieve the original 4G of data rate on the three head/disc surface combinations if possible. Finally, if there is more than one very weak head/disc surface combination found in the disc drive, then de-frequency scheme 312 is used to squeeze 3G of data rate from the four head/disc surface combinations, as indicated at block 416.

According to an illustrative embodiment, the capacity tuning process 300 of the present invention is implemented as computer software. Thus error rate testing module 302, capacity decision making module 304, variable BPI module 308, head depopulation module 310, and de-frequency module 312 are all implemented as software. These software modules are stored on a program storage device, such as memory 14, readable by a computer system such as drive controller 12. The software is executable by the computer system such as drive controller 12.

The capacity tuning process of the present invention offers many advantages over the prior art. It provides a manufacturing process capable of automatically configuring each drive to its maximum capacity. It also allows the implementation of a reworkless production line. This process is also capable of producing a variety of models of a family of drives from the same production line. Additionally, the capacity tuning process can predetermine the optimized capacity of a drive before the defect test process, thereby greatly improving the yield of the process and also saving a great deal of rework cost.

In summary, one embodiment of the present invention is directed to a method of configuring a disc drive 10. A data transfer capability of the disc drive 10 is determined and the disc drive 10 is configured based on the data transfer capability.

In one embodiment of the present invention, configuring the disc drive 10 involves adjusting the data storage capacity of the disc drive 10 based on the data transfer capability of the disc drive 10.

In another embodiment, the data transfer capability is determined for a plurality of head/disc surface combinations in the disc drive 10 and the disc drive 10 is configured based on the data transfer capabilities of each head/disc surface combination.

In a further embodiment, if the data transfer capability of the disc drive 10 is below a first threshold, the bit density of the disc surface 36, 38, 40, 42, 44, 46 of a first head/disc surface combination is reduced and the bit density of the disc surface 36, 38, 40, 42, 44, 46 of a second head/disc surface combination is increased. If, after that, the data transfer capability of the disc drive 10 remains below the first threshold, it is determined how many, if any, of the head/disc surface combinations have a data transfer capability below a second threshold. If one of the head/disc surface combinations have a data transfer capability below the second threshold, the head H0, H1, H2, H3, H4, H5 of said head/disc surface combination is disabled. If two or more of the head/disc surface combinations have a data transfer capability below the second threshold, the bit density of the entire disc drive 10 is reduced.

Another embodiment of the present invention is directed to a program storage device 14 that is readable by a computer system 12 and that tangibly embodies a program of instructions executable by the computer system 12 to perform a method of configuring a disc drive 10. Pursuant to the method, a write/read error rate is measured for each head/disc surface combination as a function of the bit density of the respective disc surfaces 36, 38, 40, 42, 44, 46. Then a suitable drive configuration scheme is selected based on the error rate data. Next the selected drive configuration scheme is implemented.

In one embodiment of the program storage device 14, selecting a suitable drive configuration scheme involves selecting the scheme from multiple drive configuration schemes. In one of the drive configuration schemes, the bit density of the disc surface 36, 38, 40, 42, 44, 46 of one head/disc surface combination is reduced and the bit density of the disc surface 36, 38, 40, 42, 44, 46 of another head/disc surface combination is increased. Another of the drive configuration schemes involves disabling the head H0, H1, H2, H3, H4, H5 of a particular head/disc surface combination. A third drive configuration scheme involves reducing the bit density of the entire disc drive 10.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, while the capacity tuning software of the present invention is described as being stored in memory 14, separate from drive controller 12, the capacity tuning software may also be integrated within drive controller 12 without departing from the scope and spirit of the present invention. Other modifications can also be made.

What is claimed is:

1. A method of configuring a disc drive having a plurality of read/write heads, each adapted to read and write data to one of a plurality of disc surfaces, comprising steps of:

(a) determining a data transfer capability of a plurality of head/disc surface combinations in the disc drive;

(b) configuring the disc drive based on the data transfer capability by changing a bit density of a disc surface of at least one of the head/disc surface combinations if the data transfer capability of at least one of the head/disc surface combinations is below a prescribed threshold.

2. The method of claim 1 wherein configuring step (b) comprises adjusting a data storage capacity of the disc drive based on the data transfer capability.

3. The method of claim 2 wherein configuring step (b) comprises reducing a bit density of the disc surface of a first head/disc surface combination and increasing a bit density of the disc surface of a second head/disc surface combination.

4. The method of claim 2 wherein configuring step (b) comprises reducing a bit density of a disc surface of at least one of the head/disc surface combinations if the data transfer capability of two or more head/disc surface combinations is below a prescribed threshold.

5. The method of claim 4 wherein configuring step (b) comprises reducing the bit density of all of the disc surfaces if the data transfer capability of two or more head/disc surface combinations is below a prescribed threshold.

6. The method of claim 2 wherein the disc drive is categorized into one of a plurality of discrete data storage capacity levels and wherein configuring step (b) comprises configuring the disc drive to have a data storage capacity corresponding to its most suitable data storage capacity level.

7. The method of claim 1 wherein configuring step (b) comprises steps of:

(b)(i) if the data transfer capability of the disc drive is below a first threshold, reducing a bit density of the disc surface of a first head/disc surface combination and increasing a bit density of the disc surface of a second head/disc surface combination;

(b)(ii) if, after reducing and increasing step (b)(i), the data transfer capability of the disc drive remains below the first threshold, determining how many, if any, of the head/disc surface combinations have a data transfer capability below a second threshold;

(b)(iii) if one of the head/disc surface combinations has a data transfer capability below the second threshold, disabling the head of said head/disc surface combination; and (b)(iv) if two or more of the head/disc surface combinations have a data transfer capability below the second threshold, reducing a bit density of the entire disc drive.

8. The method of claim 7 further comprising steps, prior to reducing and increasing step (b)(i) of:

(b)(v) predicting whether reducing and increasing step (b)(i) will raise the data transfer capability of the disc drive to the first threshold; and (b)(vi) if it is predicted in predicting step (b)(v) that reducing and increasing step (b)(i) will not raise the data transfer capability of the disc drive to the first threshold, bypassing reducing and increasing step (b)(i).

9. The method of claim 7 wherein the disc drive is categorized into one of a plurality of discrete data storage capacity levels, the plurality of discrete data storage capacity levels including a nominal level, and wherein disabling step (b)(iii) causes the disc drive to be categorized at a data storage capacity level that is below the nominal level.

10. The method of claim 7 wherein the disc drive is categorized into one of a plurality of discrete data storage capacity levels, the plurality of discrete data storage capacity levels including a nominal level, and wherein reducing step (b)(iv) causes the disc drive to be categorized at a data storage capacity level that is below the nominal level.

11. The method of claim 7 wherein disabling step (b)(iii) further comprises increasing a bit density of the disc surface of at least one of the head/disc surface combinations.

12. The method of claim 11 wherein the disc drive is categorized into one of a plurality of discrete data storage capacity levels, the plurality of discrete data storage capacity levels including a nominal level, and wherein increasing a bit density of the disc surface of at least one of the head/disc surface combinations allows the disc drive to be categorized at the nominal level.

13. A program storage device readable by a computer system tangibly embodying a program of instructions executable by the computer system to perform a method of configuring a disc drive having a plurality of read/write heads, each adapted to read and write data to one of a plurality of disc surfaces, the method comprising steps of:

(a) measuring a write/read error rate of each head/disc surface combination as a function of a bit density of the respective disc surfaces;

(b) selecting a suitable drive configuration scheme from a plurality of drive configuration schemes based on the error rate determined in measuring step (a), wherein the plurality of drive configuration schemes comprises:

(i) reducing a bit density of the disc surface of a first head/disc surface combination and increasing a bit density of the disc surface of a second head/disc surface combination;

(ii) disabling the head of a particular head/disc surface combination; and (iii) reducing a bit density of the entire disc drive; and (c) implementing the drive configuration scheme selected in selecting step (b).

14. A disc drive comprising:

a plurality of read/write heads, each adapted to read and write data to one of a plurality of disc surfaces; and means for configuring the disc drive to a suitable data storage capacity based on the data transfer capability of the head/disc surface combinations by either reducing a bit density of the disc surface of a first head/disc surface combination or disabling the head of the first head/disc surface combination and by increasing a bit density of the disc surface of a second head/disc surface combination.

* * * * *

UNITED STATES PATENT AND TRADEMARK OFFICE
CERTIFICATE OF CORRECTION

PATENT NO.   : 6,446,156 B1
DATED        : September 3, 2002
INVENTOR(S)  : Chia et al.

It is certified that error appears in the above-identified patent and that said Letters Patent is hereby corrected as shown below:

Column 8,
Line 54, after "disc drive;" insert -- and --.

Signed and Sealed this

Eleventh Day of March, 2003

JAMES E. ROGAN
*Director of the United States Patent and Trademark Office*